(12) United States Patent
Ghorpade et al.

(10) Patent No.: US 11,624,306 B2
(45) Date of Patent: Apr. 11, 2023

(54) AFTERTREATMENT SYSTEM WITH A VARIABLE SIZE SCROLL FOR A WORK VEHICLE

(71) Applicant: CNH Industrial America LLC, New Holland, PA (US)

(72) Inventors: Kaushal Ghorpade, Chicago, IL (US); Panos Tamamidis, Mount Prospect, IL (US); Samrendra K. Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/344,435

(22) Filed: Jun. 10, 2021

(65) Prior Publication Data

US 2021/0388745 A1   Dec. 16, 2021

Related U.S. Application Data (60) Provisional application No. 63/037,874, filed on Jun. 11, 2020.

(51) Int. Cl.
*F01N 3/20* (2006.01)
*F01N 3/28* (2006.01)

(52) U.S. Cl.
CPC ............ *F01N 3/208* (2013.01); *F01N 3/2066* (2013.01); *F01N 3/2821* (2013.01);
(Continued)

(58) Field of Classification Search
CPC ...... F01N 3/208; F01N 3/2066; F01N 3/2821; F01N 2590/08; F01N 2610/02; F01N 2610/1446; F01N 2240/20; F01N 13/011
See application file for complete search history.

(56) References Cited

U.S. PATENT DOCUMENTS

| 6,401,449 B1 | 6/2002 | Hofmann et al. |
| 7,451,854 B2 | 11/2008 | Suzuki et al. |

(Continued)

FOREIGN PATENT DOCUMENTS

| DE | 10 2016 121 670 A1 | 5/2017 |
| FR | 3 020 834 B1 | 6/2016 |

(Continued)

OTHER PUBLICATIONS

Machine Translation of JP 2013231364A (Year: 2013).*
(Continued)

*Primary Examiner* — Brandon D Lee
(74) *Attorney, Agent, or Firm* — Rickard K. De Mille; Rebecca L. Henkel (57) ABSTRACT

An aftertreatment system for a work vehicle includes: a fluid injector configured to inject a treatment fluid; a selective catalytic reducer (SCR) substrate; and a mixer fluidly coupled to the fluid injector and the SCR substrate and including at least one scroll defining a scroll open area and configured to receive a flow of exhaust gas and the treatment fluid. The mixer has a fixed wall and a plate displaceably coupled to the fixed wall, the plate being associated with the at least one scroll such that a change in a flow rate of exhaust gas into the at least one scroll passively causes displacement of the plate to adjust a size of the scroll open area.

17 Claims, 4 Drawing Sheets

(52) U.S. Cl.
CPC ...... *F01N 2590/08* (2013.01); *F01N 2610/02* (2013.01); *F01N 2610/1446* (2013.01)

(56) References Cited

U.S. PATENT DOCUMENTS

| | | |
|---|---|---|
| 7,814,745 B2 | 10/2010 | Levin et al. |
| 8,407,987 B2 | 4/2013 | Andersson et al. |
| 8,418,449 B2 | 4/2013 | Tatur et al. |
| 9,453,444 B2 | 9/2016 | Fischer et al. |
| 9,518,491 B2 | 12/2016 | Tsutsumi et al. |
| 9,616,396 B2 | 4/2017 | Nande et al. |
| 9,765,681 B2 | 9/2017 | Wirth et al. |
| 9,932,871 B2 | 4/2018 | Johnson et al. |
| 10,047,657 B2 | 8/2018 | Noren, IV et al. |
| 10,188,994 B2 | 1/2019 | Tyni et al. |
| 10,287,948 B1 | 5/2019 | Moulieres et al. |
| 2010/0199645 A1 | 8/2010 | Telford |
| 2014/0090374 A1 | 4/2014 | Chavannavar |
| 2019/0040780 A1 | 2/2019 | Adelman et al. |
| 2019/0234274 A1 | 8/2019 | Hatfield et al. |

FOREIGN PATENT DOCUMENTS

| | | | | |
|---|---|---|---|---|
| JP | 2013-231364 A | | 11/2013 | |
| JP | 2013231364 A | * | 11/2013 | |
| KR | 10-1195664 A | | 10/2012 | |
| KR | 2012110842 A | * | 10/2012 | ............ B01D 53/94 |
| WO | 2005/073528 A1 | | 8/2005 | |

OTHER PUBLICATIONS

Machine Translation of KR 2012110842A (Year: 2012).*
Ghazanfar Mehdi et al., "Numerical Investigation of SCR Mixer Design Optimization for Improved Performance", Processes, retrieved Sep. 5, 2019 from: https://www.mdpi.com/2227-9717/7/3/168/htm, Mar. 2019 (22 pages).

* cited by examiner

AFTERTREATMENT SYSTEM WITH A VARIABLE SIZE SCROLL FOR A WORK VEHICLE

CROSS REFERENCE TO RELATED APPLICATION

This application claims the benefit of U.S. Provisional Patent Application No. 63/037,874, entitled "AFTERTREATMENT SYSTEM WITH A VARIABLE SIZE SCROLL FOR A WORK VEHICLE" and filed Jun. 11, 2020, the contents of which are incorporated herein by reference.

FIELD OF THE INVENTION

The present invention pertains to work vehicles and, more specifically, to an after treatment system for a work vehicle.

BACKGROUND OF THE INVENTION

Certain work vehicles (e.g., agricultural vehicles) are powered by diesel engines, which burn diesel fuel and produce exhaust gas. The exhaust gas may include undesirable byproducts such as nitrogen oxides (NOx), carbon monoxide, and particulate material. Certain work vehicles include an exhaust system that reduces the concentration of the undesired byproducts. Traditional exhaust systems may spray a diesel exhaust fluid (DEF) collinearly within the flow of exhaust gas or against a wall of a mixer. Government regulations have reduced the acceptable concentrations of the byproducts within the exhaust gas, particularly in relation to NOx. The traditional exhaust systems may not be able to satisfy new or future regulatory limits. These new regulations urge more efficient methods of regulating exhaust gases while minimizing the packaging size of the exhaust system to reduce the impact on the design of the entire vehicle.

What is needed in the art is a way to effectively reduce emissions of byproducts from a work vehicle.

SUMMARY OF THE INVENTION

Exemplary embodiments disclosed herein provide an aftertreatment system with a mixer having at least one scroll with an associated plate that is passively displaceable to adjust a size of an open area of the scroll(s).

In some exemplary embodiments provided according to the present disclosure, an aftertreatment system for a work vehicle includes: a fluid injector configured to inject a treatment fluid; a selective catalytic reducer (SCR) substrate; and a mixer fluidly coupled to the fluid injector and the SCR substrate and including at least one scroll defining a scroll open area and configured to receive a flow of exhaust gas and the treatment fluid. The mixer has a fixed wall and a plate displaceably coupled to the fixed wall, the plate being associated with the at least one scroll such that a change in a flow rate of exhaust gas into the at least one scroll passively causes displacement of the plate to adjust a size of the scroll open area.

In some exemplary embodiments provided according to the present disclosure, a work vehicle includes: a chassis; an engine carried by the chassis and comprising an engine exhaust; and an aftertreatment system fluidly coupled to the engine exhaust. The aftertreatment system includes: a fluid injector configured to inject a treatment fluid; a selective catalytic reducer (SCR) substrate; and a mixer fluidly coupled to the engine exhaust, the fluid injector, and the SCR substrate and including at least one scroll defining a scroll open area and configured to receive a flow of exhaust gas from the engine exhaust and the treatment fluid. The mixer includes a fixed wall and a plate displaceably coupled to the fixed wall. The plate is associated with the at least one scroll such that a change in a flow rate of exhaust gas into the at least one scroll passively causes displacement of the plate to adjust a size of the scroll open area.

In some exemplary embodiments provided according to the present disclosure, a method of treating emissions of a work vehicle includes: introducing a treatment fluid into at least one scroll of a mixer, the at least one scroll defining a scroll open area; introducing exhaust gas from an engine into the at least one scroll to mix the exhaust gas with the treatment fluid in the at least one scroll; displacing a plate coupled to a fixed wall of the mixer and associated with the at least one scroll such that the plate adjusts a size of the scroll open area, the displacing passively occurring in response to a change in a flow rate of the exhaust gas into the at least one scroll; and introducing the mixed exhaust gas and treatment fluid into a selective catalytic reducer substrate.

One possible advantage that may be realized by exemplary embodiments provided according to the present disclosure is that the plate displacing to adjust the size of the scroll open area can promote strong mixing during periods of low exhaust flow rate by decreasing the size of the scroll open area.

Another possible advantage that may be realized by exemplary embodiments provided according to the present disclosure is that the plate passively displaces in response to a change in the flow rate of exhaust gas so the response time of the change is near-instantaneous.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Various embodiments provided according to the present disclosure include an aftertreatment system for an exhaust system for an engine, such as a diesel engine, of a work vehicle (e.g., an agricultural vehicle). As regulations regarding exhaust emissions continue to become more stringent regarding the concentration of expelled byproducts (e.g., nitrogen oxides), manufacturers strive to produce more effective and efficient exhaust systems. Certain exhaust systems are configured to introduce a treatment fluid (e.g., diesel exhaust fluid (DEF)) into the diesel exhaust. Some exhaust systems spray the DEF collinearly with the flow of exhaust, thereby creating a distribution of the DEF within the exhaust that is at least partially non-uniform. As discussed in detail below, the exhaust system of the present disclosure includes a mixer that mixes exhaust gas with the treatment fluid, such as DEF. Because the mixer provides a substantially uniform and efficient mixture of DEF and exhaust gas, the mixer may cause the exhaust system to emit lower emissions than that of known exhaust systems. Additionally, the efficient mixing of DEF and exhaust gas enables the exhaust system to use less DEF, thereby reducing the cost to operate the exhaust system.

Figure 1:
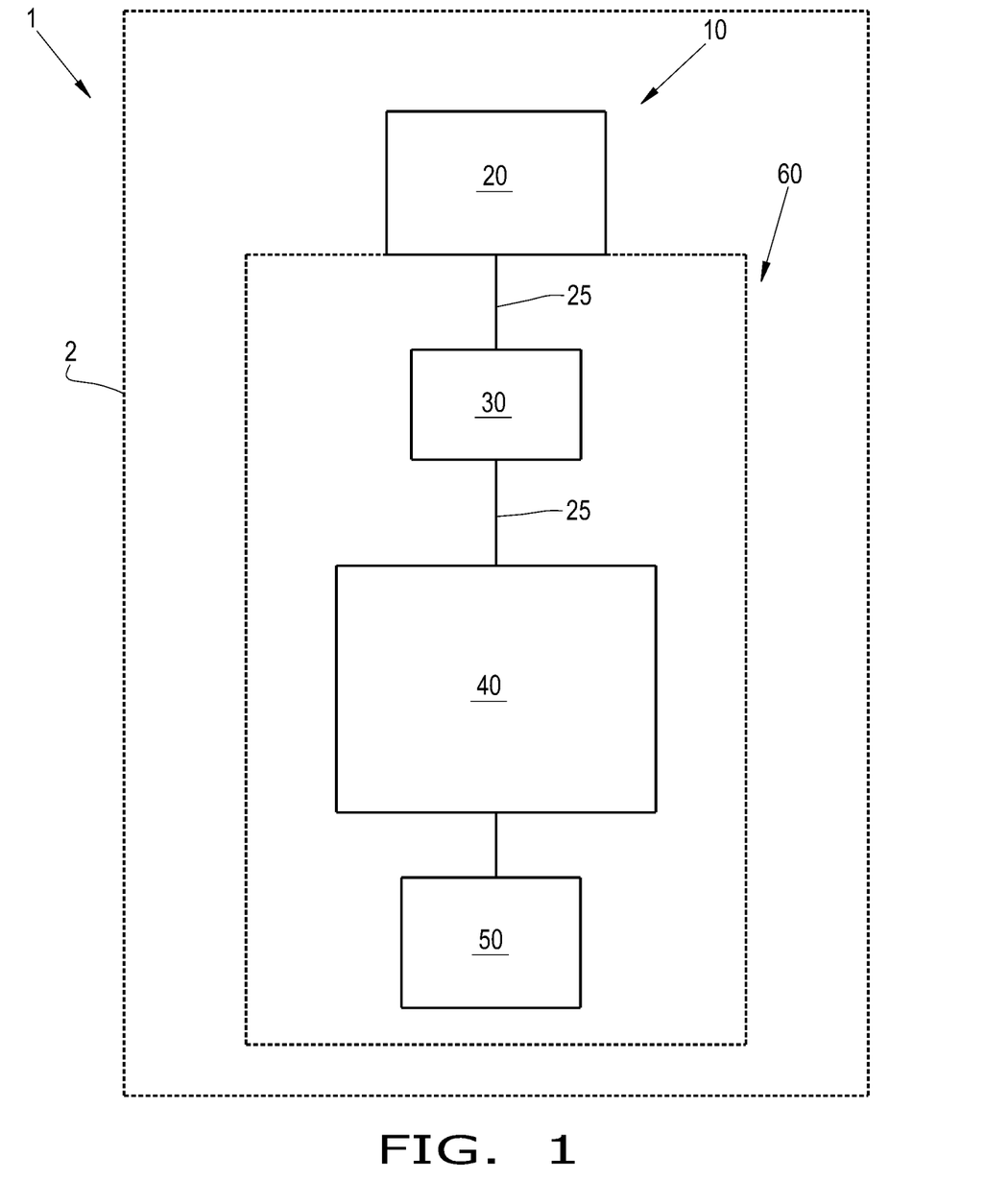
FIG. 1 illustrates a schematic view of an exemplary embodiment of a work vehicle including an exhaust system with an aftertreatment system, provided in accordance with the present disclosure.

FIG. 1 is a schematic view of an exemplary embodiment of an exhaust system 10 for a work vehicle 1, provided according to the present disclosure. The exhaust system 10 may be at least partially similar to the exhaust system disclosed in U.S. Patent Application Publication No. 2012/0124968, which is incorporated in its entirety herein by reference. As shown in FIG. 1, the exhaust system 10 includes an engine 20 carried by a chassis 2 and an aftertreatment system 60 carried by the chassis 2 and including a fluid injector 30, an exhaust treatment device 40, and a vent to atmosphere 50. The engine 20 can be an internal combustion engine, such as a gasoline engine (e.g., an automobile engine) or a diesel engine (e.g., a truck or heavy machine engine). Exhaust from the engine 20 flows through a manifold to an engine exhaust 25, such as an outlet pipe, that fluidly couples the engine 20 with the exhaust treatment device 40. The exhaust includes pollutants, such as hydrocarbons, NOx, CO2, and/or sulfur oxides ("SOx"). The exhaust can be at an elevated temperature (e.g., 750-1,000° F.). The fluid injector 30 is configured to inject a treatment fluid that reacts and/or mixes with the exhaust gas to create pre-treated exhaust. The exhaust treatment device 40 then converts the pretreated exhaust to a treated exhaust that has a reduced concentration of pollutants (e.g., NOx).

In some embodiments, the fluid injector 30 injects (e.g., atomizes) a treatment fluid comprising a urea-water solution (e.g., hydroform of urea) into the engine exhaust 25. While the treatment fluid is described herein as being a urea-water solution, it should be appreciated that any type of fluid suitable for treating exhaust gas may be utilized according to the present disclosure. The urea-water solution, which may also be referred to as "diesel exhaust fluid" or "DEF," can evaporate, due to the heat from the exhaust, to produce urea and water vapor. Subsequently, urea can decompose into ammonia and isocyanic acid, in a reaction called thermolysis. Isocyanic acid can further react with water vapor to produce more ammonia and carbon dioxide. Although urea is atomized by the fluid injector 30 to enhance the mixing and/or reaction with the exhaust, not all of the urea can react to form ammonia due to size and space constraints of the exhaust system 10. Accordingly, the pre-treated exhaust gases can include, among many components, NOx, SOx, evaporated ammonia, and liquid un-decomposed urea in the form of droplets. The pre-treated exhaust then passes through the exhaust treatment device 40 which, in some embodiments, is a selective catalytic reducer (SCR) muffler. The SCR muffler includes a catalyst that enhances the reaction between ammonia and NOx to reduce the NOx concentration of the treated exhaust that flows through the vent to atmosphere 50.

Figure 2:
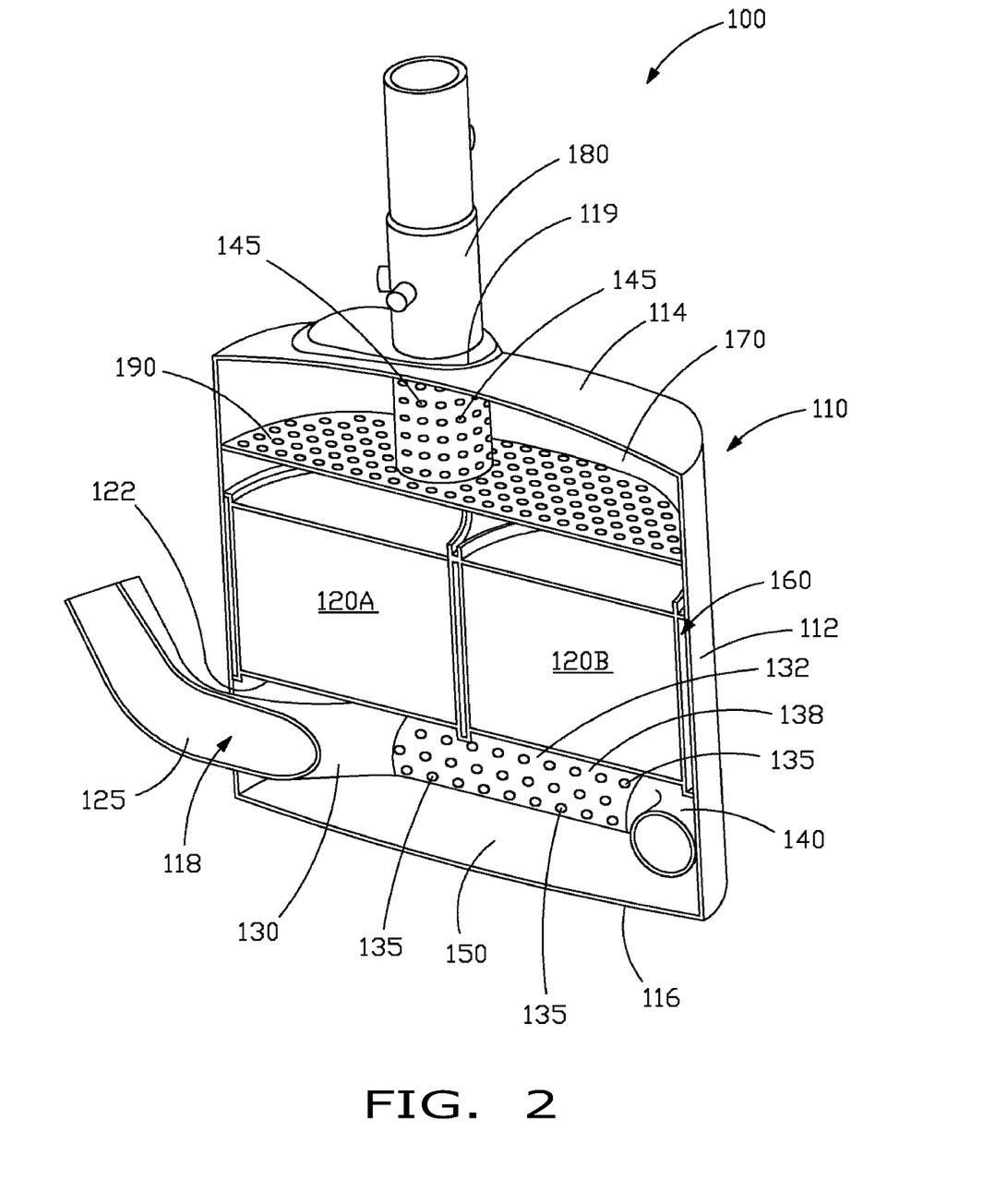
FIG. 2 illustrates a cross-sectional view of an exemplary embodiment of an exhaust treatment device of the aftertreatment system of FIG. 1, provided in accordance with the present disclosure.

FIG. 2 is a cross-sectional view of an exemplary embodiment of an SCR muffler 100 provided according to the present disclosure. As shown in FIG. 2, the SCR muffler 100 includes a housing 110, at least one SCR substrate, illustrated as two SCR substrates 120A and 120B, an inlet pipe 125, a mixer 130, and an outlet pipe 180. The housing 110 includes a side wall 112, a top wall 114, a bottom wall 116, an inlet 118, and an outlet 119. The housing 110 can be formed out of a metal or a metal alloy, for example, steel, stainless steel, or other similar materials. The inlet pipe 125 is in fluid communication with an engine (e.g., the engine 20 in FIG. 1) and the mixer 130. The inlet pipe 125 passes through the inlet 118 defined in the sidewall 112 of the housing 110. In some embodiments, the inlet 118 can be defined in the bottom wall 116 of the housing 110. In some embodiments, the mixer 130 is also fluidly coupled to the fluid injector 30. The mixer 130 is disposed in a mixing chamber 150 that is defined by the bottom wall 116, the lower edge 122 of SCR substrates 120A and 120B, and a lower portion of the sidewall 112.

The mixer 130 may include a first branch 132 and a second branch (not shown). The first branch 132 and the second branch can form a mixing loop, which can be ovular, circular, rectangular, symmetric, asymmetric, or any other shape or configuration that creates a loop. An end section 140 can join the first branch 132 and the second branch of the mixer 130 to form the mixing loop. A plurality of apertures 135 is defined in a wall 138 of the mixer 130. As shown, the mixer 130 is located in the mixing chamber 150.

The SCR substrates 120A and 120B may be disposed in a substrate chamber 160 that is fluidly coupled with the mixer 130, the mixing chamber 150, and an outlet chamber 170. The SCR substrates 120A and 120B can each include an active component and, in some embodiments, a carrier component. The active component is exposed to the exhaust gases and can be a catalytic material (e.g., platinum, palladium, rhodium, and/or vanadium) that is adapted to enhance the rate of the chemical reaction between NOx and ammonia. The catalytically-enhanced reactions between NOx and ammonia, generally referred to as the "NOx reactions," are well known in the art. The carrier component (e.g., a ceramic) can be used as a base material to support the active component. The SCR substrates 120A and 120B can have the same or different active and/or carrier components. In some embodiments, the SCR substrates 120A and 120B can be replaced by a single SCR substrate. In other embodiments, three or more SCR substrates can be disposed in the substrate chamber 160.

The outlet chamber 170 is disposed between the substrate chamber 160 and the top wall 114 of the housing 110. The exhaust pipe 180 passes through the outlet 119 defined in the top wall 114 of the housing 110. In some embodiments, the outlet 119 can be defined in the sidewall 112 of the housing 110. In some embodiments, the exhaust pipe 180 does not extend into the outlet chamber 170. The exhaust pipe 180 includes optional apertures 145 to receive exhaust gas. An optional perforated plate 190 can connect to the exhaust pipe 180 and the sidewall 112. The perforated plate 190 can be formed out of a rigid material (e.g., steel and/or stainless steel) and can provide structural support for the exhaust pipe 180.

In known aftertreatment systems, mixing of the DEF and exhaust gas is affected by the flow rate of exhaust gas into a scroll of the mixer that defines a constant scroll open area.

At high flow rates of exhaust gas, there is good mixing between the exhaust gas and the DEF to produce a flow of well-mixed exhaust gas and DEF. However, if the flow rate of exhaust gas decreases, the mixing between the DEF and the exhaust gas can suffer due to decreased flow velocity and an overly large open area of the scroll. The decrease in mixing of the DEF and the exhaust gas can reduce the efficiency of the SCR, resulting in increased byproduct emissions and/or requiring more DEF to decrease the emissions to an acceptable level.

Figure 3:
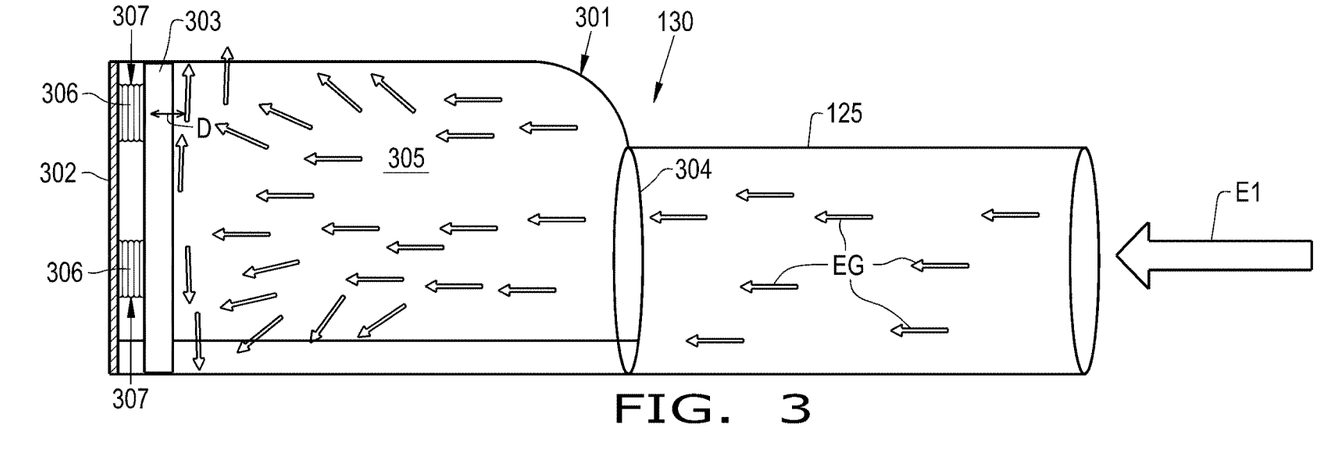
FIG. 3 illustrates a cross-sectional view of a mixer of the exhaust treatment device of FIG. 2, including a scroll with a plate in a first position.
Figure 4:
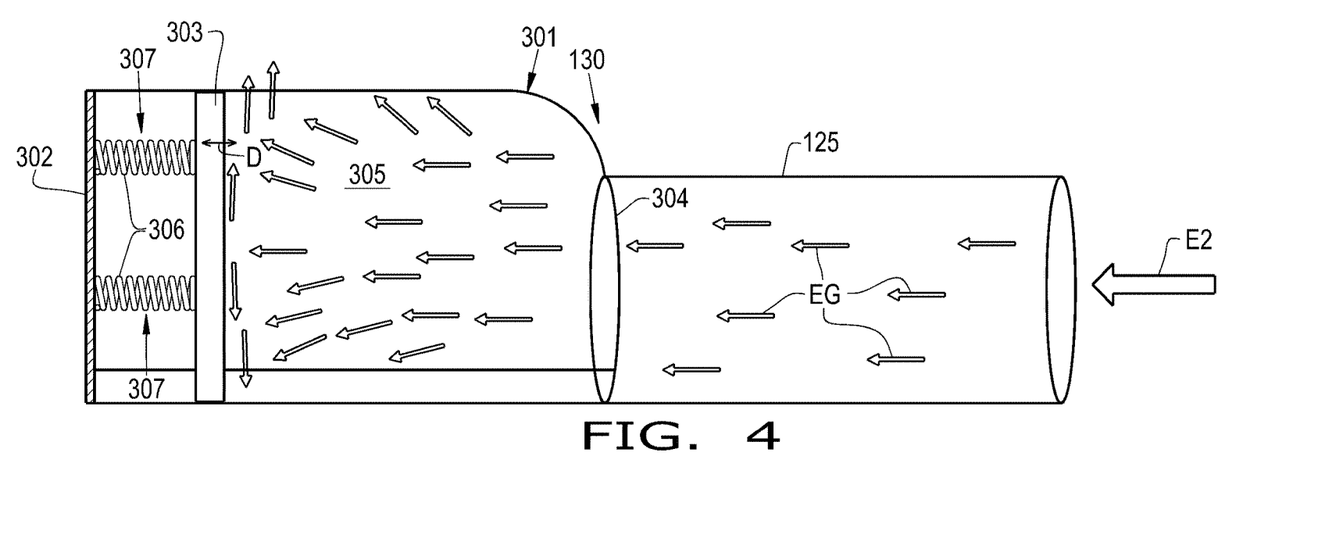
FIG. 4 illustrates a cross-sectional view of the mixer of FIG. 3 after the plate has displaced to a second position responsively to a change in a flow rate of exhaust gas into the scroll.

To address some of the previously described issues of known aftertreatment systems, and referring now to FIGS. 3-4, the mixer 130 provided according to the present disclosure include at least one scroll 301 configured to receive a flow of exhaust gas and the treatment fluid to mix the exhaust gas and the treatment fluid within the scroll(s) 301. For ease of description, a single scroll 301 is illustrated as being included in the mixer 130, but it should be appreciated that more than one scroll, such as two or more scrolls, may be incorporated in the mixer 130. The mixer 130 includes a fixed wall 302 and a plate 303 that displaceably coupled to the fixed wall 302. As used herein, the plate 303 is "displaceably coupled" to the fixed wall 302 in the sense that the plate 303 may displace toward and away from the fixed wall 302, as will be described further herein. The scroll 301 defines a scroll open area 305, which may be a cross-sectional area of the scroll opening.

The plate 303 is associated with the scroll 301 such that a change in a flow rate of exhaust gas passively causes displacement of the plate 303 to adjust a size of the scroll open area. As used herein, displacement of the plate 303 is "passively" caused in the sense that the plate 303 automatically displaces in response to the change in the flow rate, i.e., no elements, such as actuators, have to be selectively activated in order to displace the plate 303 responsively to the change in the flow rate. Referring specifically now to FIG. 3, it is illustrated how the plate 303 may be in a first position when the flow rate of exhaust gas into the scroll 301 is at a relatively high level, as indicated by the arrow E1. As can be seen in FIG. 3, the scroll open area 305 is relatively large. However, if the flow rate of exhaust gas into the scroll 301 decreases, as illustrated in FIG. 4 by a smaller arrow E2, the plate 303 displaces to a second position that is further from the fixed wall 302 than the first position so the scroll open area 305 decreases. Decreasing the size of the scroll open area 305 promotes maintenance of sufficient velocity and mixing of the exhaust gas and the treatment fluid within the scroll 301, even at decreased flow rates of exhaust gas, to produce a well-mixed gas of exhaust gas and treatment fluid, which can be appreciated from the arrows illustrated in the scroll 301 and representing gas flows within the scroll 301. Similarly, once the flow rate of exhaust gas into the scroll 301 increases, the plate 303 can displace toward the fixed wall 302 to increase the size of the scroll open area 305 so the velocity of the exhaust gas and treatment fluid within the scroll 301 is not too high in order to provide sufficient time for mixing of the exhaust gas and treatment fluid within the mixer 130. Thus, it should be appreciated that a change in the flow rate of exhaust gas into the scroll 301 causes displacement of the plate 303 to adjust the size of the scroll open area 305 in order to promote efficient and complete mixing of the exhaust gas and the treatment fluid.

In some embodiments, the mixer 130 includes a compressible material 306 that is disposed between the plate 303 and the fixed wall 302. The compressible material 306 may compress responsively to the flow rate of exhaust gas increasing, with the increased flow rate of exhaust gas exerting an increased pressure on the plate 303 to compress the compressible material 306 so the plate 303 displaces toward the fixed wall 302 and increases the size of the scroll open area 305. Similarly, when the flow rate of exhaust gas into the scroll 301 decreases, the compressible material 306 may expand to displace the plate 303 away from the fixed wall 302 and decrease the size of the scroll open area 305. In some embodiments, the mixer 130 includes at least one spring, illustrated as two springs 307, that includes the compressible material 306 and couples the plate 303 to the fixed wall 303. The compressible material 306 may be, for example, spring steel or a similar type of material that can withstand the high temperatures and pressures that are produced within the mixer 130. While the compressible material 306 is illustrated and described as being part of springs 307, it should be appreciated that the compressible material 306 may be provided as a mass of material that does not have the shape of a spring, such as a foam, and/or may include a compressible fluid, such as a compressible gas, that is disposed between the plate 303 and the fixed wall 302 and acts on the plate 303.

In some embodiments, an inlet 304 of the mixer 130, which may be coupled to the inlet pipe 125, faces the plate 303 so that the flow of exhaust gas introduced into the scroll 301 tends to travel towards the plate 303, as illustrated in FIGS. 3 and 4. By directing the flow of exhaust gas toward the plate 303, a greater proportion of the exhaust gas can contact the plate 303 to passively cause displacement of the plate 303 when the flow rate of the exhaust gas changes. In some embodiments, the entirety of the inlet 304 faces the plate 303. Similarly, the plate 303 may be configured to displace in a direction D that is parallel to a flow direction of the flow of exhaust gas, which is represented by arrows EG, due to the flow of the exhaust gas producing a pressure on the plate 303. Arranging the inlet 304 so the inlet 304 faces the plate 303 and the flow of exhaust gas passively causes displacement of the plate 303 in the direction D that is parallel to the flow direction EG can allow for passive displacement of the plate 303 without having to provide a complex flow path of the exhaust gas and can also provide a fast response time to changes in the flow rate of the exhaust gas.

From the foregoing, it should be appreciated that the mixer 130 including the scroll 301 and the plate 303 provided according to the present disclosure can passively self-adjust to changes in the flow rate of exhaust gas to maintain suitable mixing performance. The plate 303 can be passively displaced by the change in the flow rate of the exhaust gas in a variety of ways to adjust the size of the scroll open area 305, such as by using the previously described compressible material 306 and/or springs 307. Further, the mixer 130 can be configured so the displacement of the plate 303 occurs shortly after the change in the flow rate of exhaust gas to quickly adapt to changing exhaust flow rates. Thus, the mixer 130 provided according to the present disclosure can maintain suitable mixing performance in a compact package that quickly and reliably reacts to changes in the flow rate of exhaust gas from the engine 20.

Figure 5:
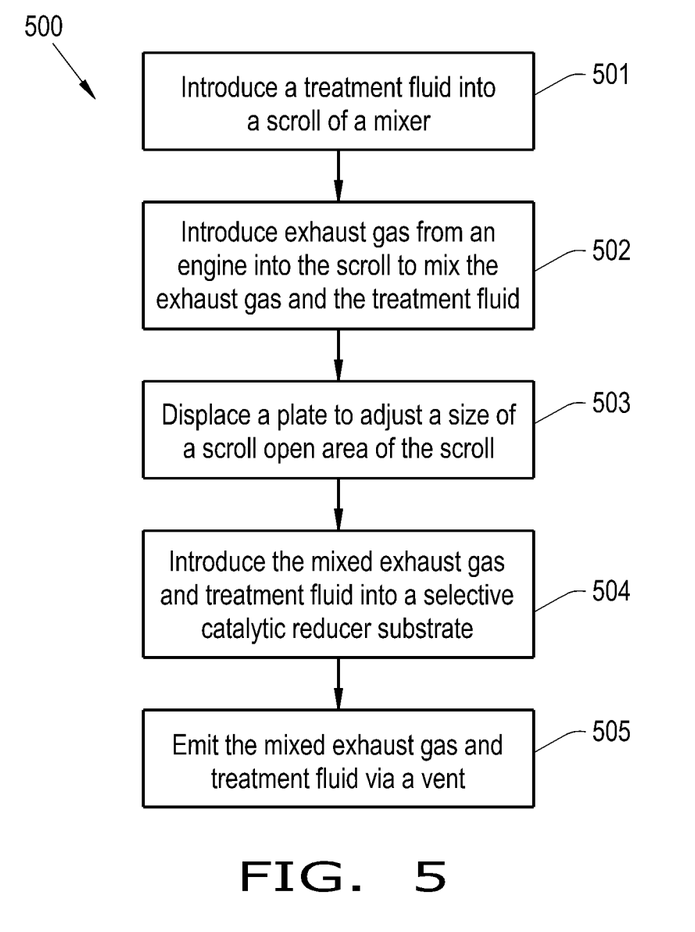
FIG. 5 illustrates a flow chart of an exemplary embodiment of a method of treating emissions of a work vehicle, provided in accordance with the present disclosure.

Referring now to FIG. 5, an exemplary embodiment a method 500 of treating emissions of a work vehicle, such as the previously described work vehicle 1, is provided in accordance with the present disclosure. The method 500 includes introducing 501 a treatment fluid into the scroll 301 of the mixer 130. Exhaust gas from the engine 20 is introduced 502 into the scroll(s) 301 to mix the exhaust gas with the treatment fluid in the scroll(s) 301. The plate 303 is displaced 503 passively in response to a change in the flow rate of exhaust gas into the scroll(s) 301 to adjust the size of the scroll open area 305. The mixed exhaust gas and treatment fluid, which may be a well-mixed solution, is introduced 504 into the SCR substrate(s) 120A, 120B before being emitted 505 from the work vehicle 1 via the vent 50. As previously described, the displacing 503 may include displacing the plate 303 toward the fixed wall 302 if the change in the flow rate of exhaust gas is an increase in the flow rate of exhaust gas to increase the size of the scroll open area or, alternatively, may include displacing the plate 303 away from the fixed wall 302 if the change in the flow rate of exhaust gas is a decrease in the flow rate of exhaust gas to decrease the size of the scroll open area 305, as previously described. It should thus be appreciated that the method 500 provided according to the present disclosure can be used to also maintain sufficient mixing in the mixer 130 responsively to changing flow rates of exhaust gas.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An aftertreatment system for a work vehicle, comprising:
   a fluid injector configured to inject a treatment fluid;
   a selective catalytic reducer (SCR) substrate; and
   a mixer fluidly coupled to the fluid injector and the SCR substrate and comprising at least one scroll defining a scroll open area and configured to receive a flow of exhaust gas and the treatment fluid, the mixer comprising a fixed wall and a plate displaceably coupled to the fixed wall, the plate being associated with the at least one scroll such that a change in a flow rate of exhaust gas into the at least one scroll passively causes displacement of the plate to adjust a size of the scroll open area, the mixer comprising an inlet facing the plate that is completely overlapped by the plate and configured to receive the flow of exhaust gas.

2. The aftertreatment system of claim 1, wherein the mixer comprises a compressible material disposed between the plate and the fixed wall.

3. The aftertreatment system of claim 2, wherein the mixer comprises at least one spring comprising the compressible material and coupling the plate to the fixed wall.

4. The aftertreatment system of claim 1, wherein the plate is configured to displace away from the fixed wall when the flow rate of exhaust gas decreases and decrease the size of the scroll open area.

5. The aftertreatment system of claim 4, wherein the plate is configured to displace toward the fixed wall when the flow rate of exhaust gas increases and increase the size of the scroll open area.

6. The aftertreatment system of claim 1, wherein the plate is configured to displace in a direction that is parallel to a flow direction of the flow of exhaust gas.

7. A work vehicle, comprising:
   a chassis;
   an engine carried by the chassis and comprising an engine exhaust; and
   an aftertreatment system fluidly coupled to the engine exhaust, the aftertreatment system comprising:
   a fluid injector configured to inject a treatment fluid;
   a selective catalytic reducer (SCR) substrate; and
   a mixer fluidly coupled to the engine exhaust, the fluid injector, and the SCR substrate and comprising at least one scroll defining a scroll open area and configured to receive a flow of exhaust gas from the engine exhaust and the treatment fluid, the mixer comprising a fixed wall and a plate displaceably coupled to the fixed wall, the plate being associated with the at least one scroll such that a change in a flow rate of exhaust gas into the at least one scroll passively causes displacement of the plate to adjust a size of the scroll open area, the mixer comprising an inlet facing the plate that is completely overlapped by the plate and configured to receive the flow of exhaust gas.

8. The work vehicle of claim 7, wherein the mixer comprises a compressible material disposed between the plate and the fixed wall.

9. The work vehicle of claim 8, wherein the mixer comprises at least one spring comprising the compressible material and coupling the plate to the fixed wall.

10. The work vehicle of claim 7, wherein the plate is configured to displace away from the fixed wall when the flow rate of exhaust gas decreases and decrease the size of the scroll open area.

11. The work vehicle of claim 10, wherein the plate is configured to displace toward the fixed wall when the flow rate of exhaust gas increases and increase the size of the scroll open area.

12. The work vehicle of claim 7, wherein the plate is configured to displace in a direction that is parallel to a flow direction of the flow of exhaust gas.

13. A method of treating emissions of a work vehicle, comprising:
    introducing a treatment fluid into at least one scroll of a mixer, the at least one scroll defining a scroll open area;
    introducing exhaust gas from an engine into the at least one scroll to mix the exhaust gas with the treatment fluid in the at least one scroll;
    displacing a plate coupled to a fixed wall of the mixer and associated with the at least one scroll such that the plate adjusts a size of the scroll open area, the displacing passively occurring in response to a change in a flow rate of the exhaust gas into the at least one scroll, the mixer comprising an inlet facing the plate that is completely overlapped by the plate and receives the introduced exhaust gas; and
    introducing the mixed exhaust gas and treatment fluid into a selective catalytic reducer substrate.

14. The method of claim 13, wherein the displacing comprises:
    displacing the plate toward the fixed wall if the change in the flow rate of the exhaust gas is an increase in the flow rate of the exhaust gas to increase the size of the scroll open area; or
    displacing the plate away from the fixed wall if the change in the flow rate of the exhaust gas is a decrease in the flow rate of the exhaust gas to decrease the size of the scroll open area.

15. The method of claim 13, wherein the mixer comprises a compressible material disposed between the plate and the fixed wall.

16. The method of claim 15, wherein the mixer comprises at least one spring comprising the compressible material and coupling the plate to the fixed wall.

17. The method of claim 13, wherein the plate displaces in a direction that is parallel to a flow direction of the flow of exhaust gas.

\* \* \* \* \*